United States Patent [19]

Simpson

[11] Patent Number: 5,031,834
[45] Date of Patent: Jul. 16, 1991

[54] MARKING FOAM SYSTEM FOR AGRICULTURAL EQUIPMENT

[76] Inventor: Virgil Simpson, Rte. 1, Box. 144, Ranson, Kans. 67572

[21] Appl. No.: 279,019

[22] Filed: Dec. 2, 1988

[51] Int. Cl.⁵ ............................................. B05B 7/26
[52] U.S. Cl. .................................... 239/172; 169/15; 239/150; 239/163; 239/305; 239/427; 239/434
[58] Field of Search ............... 239/150, 163, 170, 172, 239/175, 302–305, 332, 427, 434; 222/135; 169/14, 15

[56] References Cited

U.S. PATENT DOCUMENTS

| | | |
|---|---|---|
| 2,995,307 | 8/1961 | McMahon . |
| 3,083,913 | 4/1963 | Coffman et al. . |
| 3,211,381 | 10/1965 | Rasmussen ........................... 239/172 |
| 3,373,938 | 3/1968 | Sweet ................................... 239/150 |
| 3,388,868 | 6/1968 | Watson et al. ........................ 169/15 |
| 3,481,545 | 12/1969 | Cooke et al. . |
| 3,584,788 | 6/1971 | Lloyd . |
| 3,599,866 | 8/1971 | Bolton ................................. 239/163 |
| 3,784,100 | 1/1974 | Kirschmann . |
| 3,801,015 | 4/1974 | Hayes .................................. 239/175 |
| 3,972,476 | 8/1976 | Hall . |
| 3,985,333 | 10/1976 | Paulsen . |
| 4,227,649 | 10/1980 | Poffenroth . |
| 4,252,274 | 2/1981 | Kubacak . |
| 4,267,973 | 5/1981 | Stewart . |
| 4,273,264 | 6/1981 | Legg .................................... 239/150 |
| 4,296,875 | 10/1981 | Borglum . |
| 4,311,274 | 1/1982 | Neal . |
| 4,318,443 | 3/1982 | Cummins ............................. 169/15 |
| 4,519,338 | 5/1985 | Kramer et al. . |
| 4,798,325 | 1/1989 | Block ................................... 239/170 |

FOREIGN PATENT DOCUMENTS

911813 10/1972 Canada ................................. 239/163

Primary Examiner—Andres Kashnikow
Assistant Examiner—Michael J. Forman

[57] ABSTRACT

A marking system for indicating the boundaries of an area that has been treated includes a storage tank for storing the liquid and the foaming agent that is fluidically separated from a foam tube. A mixing control element fluidically connects a compressor to the foam tube and connects the storage tank to the foam tube whereby the ratios and parameters associated with the formation of the marking foam can be varied. The system includes two marking foam dispensing nozzles.

8 Claims, 3 Drawing Sheets

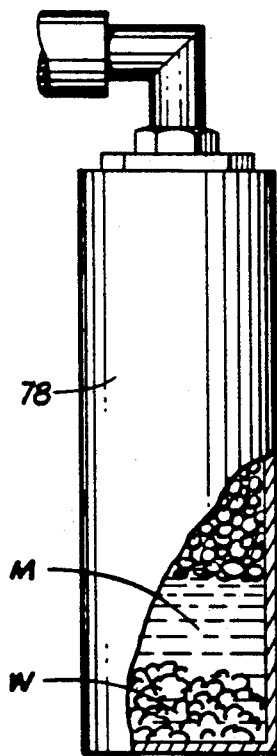
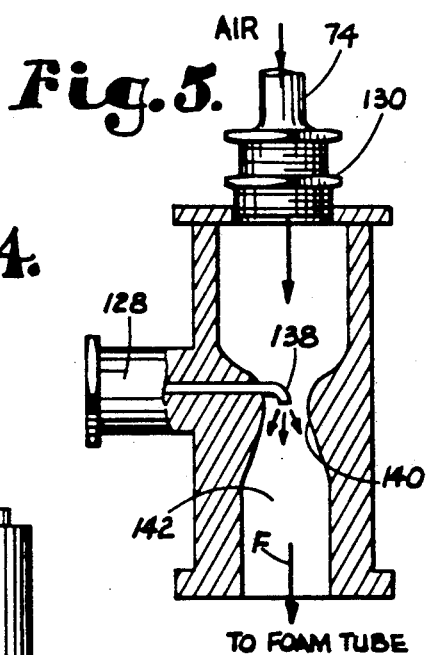
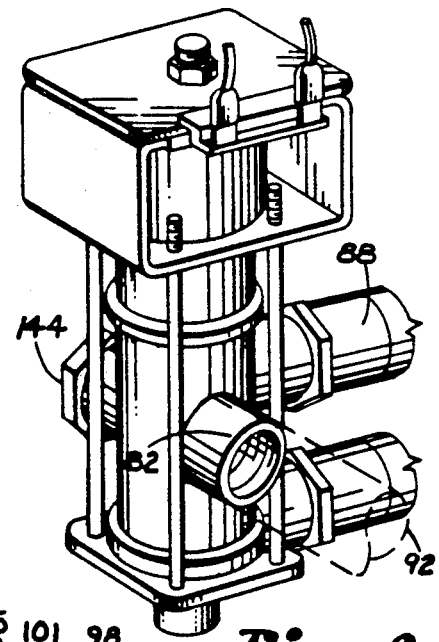
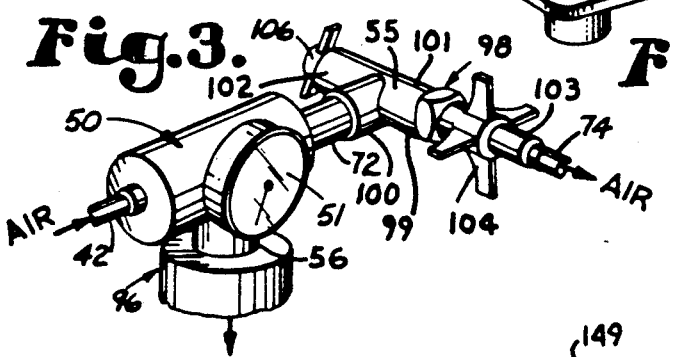
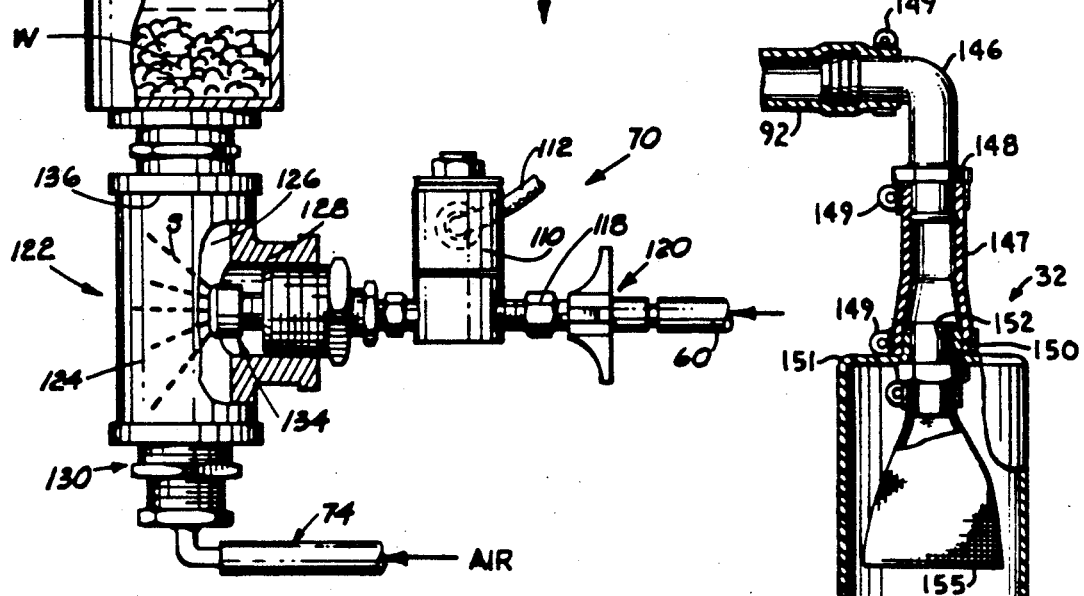

MARKING FOAM SYSTEM FOR AGRICULTURAL EQUIPMENT

BACKGROUND OF THE INVENTION

1. Field of the Invention

The present invention relates in general to land vehicles, and in particular to agricultural vehicles and systems associated with such agricultural vehicles. Specifically, the present invention relates to a marking system for indicating the boundaries of an area treated by an agricultural vehicle.

2. Description of the Prior Art

Modern agricultural science includes the treatment of large areas for many reasons, such as applying fertilizers, herbicides, insecticides and the like. For many reasons, including economy, ecology, efficiency and maximized coverage, it is important that the area being treated be clearly marked to distinguish the areas that have already been treated from the areas that have not yet been treated.

For this reason, there have been several proposals for systems that demark and identify areas of treatment by various agricultural techniques and processes. Some of these proposals have included mechanical demarcation devices, and some of the proposals have included spraying marking foam to form the marking system.

No matter what design is used, however, there are certain requirements that should be met to ensure that the marking system is effective for the intended purpose.

For example, the marking system should be amenable to efficient operation by a minimum number of people. It is this requirement that often presents drawbacks to the mechanical systems.

Still further, the marking system should not, itself, be a source of crop damage. Here, also, the mechanical systems have been found lacking.

The agricultural marking system will be subject to many conditions that may change within a single operation and may also change from operation to operation. In order to be most effective, the marking system should be amenable to producing a clear marking system under all sorts of conditions which may be subject to change even within a single application.

While mechanical systems involving placement of stakes or the like may be somewhat amenable to providing a clear marking system each time, such systems are so wasteful of manpower and may be so time consuming as to make them economically undesirable. Coupled with the other disadvantages of such systems, mechanical marking systems do not appear to be a viable way of effecting the marking of areas of treatment.

In view of the shortcomings of mechanical systems, there have been several proposals for nonmechanical marking systems. These nonmechanical systems generally involve the use of marking foam that is sprayed onto the area behind a motor vehicle.

While somewhat effective in overcoming the just-mentioned drawbacks asscociated with mechanical marking systems, the present foam spraying systems have their own drawbacks.

Chief among such drawbacks results from the lack of adaptability for these systems. That is, the marking systems that spray foam onto an area to demark that area are subject to producing results of varying effectiveness as conditions change.

For example, as discussed above, it is necessary for the marking system to provide a clearly evident mark over the entire range of the area being treated. This mark should not deteriorate to a level that it cannot be easily seen by workers at a later time whereby an already-treated area is re-treated because the markings were not evident enough. Clearly, to ensure such a situation does not exist, the marking foam can be made dark and thick enough to compensate for such a later deterioration of marking foam. However, such a solution may prove wasteful of marking foam by making some areas too dark in order to ensure that other areas have marks that are dark enough to be easily seen. This problem of nonevident markings may also occur at or near the end of a run when the supply of marking foam-producing material is nearly exhausted.

Another problem associated with the lack of adaptability of present foam marking systems occurs when conditions of a run change from earlier conditions within that run or from conditions existing in a prior run. System settings may make the marking acceptable for the earlier-existing conditions, but not for the later-encountered conditions. This can also be a result of portions of the dispensing system functioning differently at different times, for example due to clogging or the like. Present systems really do not have any effective method for accounting for such variation in operating conditions, and thus, nonuniform markings may result from the present systems which mark using foam which is applied using a spray system.

Still further, in order to be most effective, that portion of the overall system directed to fluid storage should be designed specifically for fluid storage, and that portion of the overall system directed to marking foam production should be designed for such operation. However, in most of the present systems, one tank is used to both store and make the marking foam. This requires such a tank to balance design considerations whereby some storagerelated functions may be less efficient in order to make foam-making functions viable and vice versa. System maintenance and cleaning may be difficult in such systems as well.

Since the final foam-marking product may be dependent on the ratio of the various components used to form that marking foam and the conditions under which it is formed, to be most effective, the overall system should include some means for controlling and varying such parameters as necessary. However, present systems generally make the marking foam in a single tank and then dispense that foam using nozzles or the like. There is no means for varying the conditions or the ratios, or both, associated with the making and the dispensing of the final foam-marking product. Therefore, the final product in most of the present systems may not have the proper quality to be most effective for a particular application.

A still further drawback to present systems is the use of a pump for moving foam through the system. It may be more efficient to move liquid or a mixture of liquid and foaming agent by some means, and then to move marking foam using a motive means that is most efficient in moving such fluids. Present marking foam systems do not make this distinction in fluid properties and thus, may not be efficient as possible.

Therefore, while present marking systems that use marking foam are successful in overcoming some drawbacks associated with other systems, the nonadaptability and lack of efficient foam-forming and moving means of such foam marking systems may create problems that tend to vitiate the overall performance of such systems.

Accordingly, there is a need for marking system that uses marking foam, but which is adaptable and amenable to changing operation to account for changing conditions to produce effective markings for all conditions to which the system may be exposed, and which can be designed to be most efficient in its overall operation.

OBJECTS OF THE INVENTION

It is a main object of the present invention to provide a foam marking system for indicating the boundaries of an area treated by an agricultural vehicle that is capable of providing efficient and effective markings under all conditions.

It is another object of the present invention to provide a foam marking system for indicating the boundaries of an area treated by an agricultural vehicle that is capable of varying the parameters affecting the makeup of the foam dispensed during the operation of the system in a manner that produces the most effective markings for a particular application.

It is another object of the present invention to provide a foam marking system for indicating the boundaries of an area treated by an agricultural vehicle that has the components thereof capable of being designed for the most efficient operation associated with that particular element.

It is a specific object of the present invention to provide a foam marking system for indicating the boundaries of an area treated by an agricultural vehicle that has the foam-making product storage element separated from and independent of the foam makeup and foam-forming elements.

It is another specific object of the present invention to provide a foam marking system for indicating the boundaries of an area treated by an agricultural vehicle that includes a specific element that can be controlled to produce marking foam that is most effective for a particular application and condition.

SUMMARY OF THE INVENTION

These and other objects are achieved by a foam marking system which is adapted for use with agricultural vehicles to indicate the boundaries of treated areas, which system includes means for quickly and easily varying the parameters and ratios of the components of the marking foam being dispensed. The system fluidically and physically separates the foam-making elements from the storage elements, and thus, permits variation of the various parameters without unduly affecting the other parameters.

In this manner, the marking system can be adjusted to account for changed conditions to produce the most effective and efficient marking. This change can be effected between runs or during a run if necessary. Still further, due to this separation of elements, each element can be designed to accomplish the objectives associated therewith without sacrificing other objectives and design factors associated with other functions of the system. This separation of elements also permits use of pumping devices that are designed for the most efficient operation of the system and are not constrained in the manner of many prior art systems.

Specifically, the foam spray marking system embodying the present invention includes an air compressor and a storage tank that is adapted to store liquid and a foaming agent and which is fluidically connected to the air compressor. The system also includes a mixing control means which is fluidically connected to the air compressor and to the storage tank and has means for mixing the compressed air with the mixture of liquid and foaming agent dispensed from the storage tank to form a mixture that is usable for generating marking foam. This mixing control means is fluidically coupled to a foam tube which converts the fluid from the mixing control means into marking foam.

The mixing control means includes means that can adjust the amount of compressed air being used to form the marking foam fluid and the amount of liquid/foaming agent being used in such fluid independently of each other whereby the most efficient and effective marking foam can be generated in the foam tube for the particular conditions to which the overall system is subjected at any particular time during its operation.

The adjustment means includes a solenoid-operated valve or a venturi-like fluid mixing chamber wherein compressed air flows past a dispensing spray nozzle to assist in the withdrawing of liquid/foaming agent therefrom. The amount of fluid and the mixing ratios involved can thus be readily adjusted to meet the exact conditions of the system at any time.

Further control of the system can be effected since the system includes control valves and the like which are situated in the system to effect the most desirable control over the fluid flowing in the system. The air compressor is used to drive the liquid mixture out of the storage tank, and thus, the system embodying the present invention does not require pumps for moving foam, and the amount of compressed air flowing to the storage tank can be adjusted to account for supply depletion in that storage tank without adversely affecting the ratios and parameters associated with the making of the marking foam in the foam tube. This makes the overall system more efficient and reliable than many prior art systems that rely on pumps to move fluid from one place in the system to another.

The physical and fluidic separation of the various components of the system also permit each component to carry out its intended function in the most effective and efficient manner, and also permits the system to be easily and efficiently serviced while also permitting the system to be modified to account for vagaries in the operation of individual components, such as might result from the malfunctioning of one marking foam dispensing nozzle.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a perspective view showing the check valve used in the system embodying the present invention.

FIG. 4 is a side elevational view showing a foam tube and mixing control means used in the system of the present invention.

FIG. 5 is a side elevational view of an alternative form of the mixing control means used in the system embodying the present invention.

FIG. 6 is a perspective view showing a three-way control valve used in the system of the present invention.

FIG. 7 is a side elevational view, partially cut away, showing a marking foam dispensing nozzle used in the system of the present invention.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
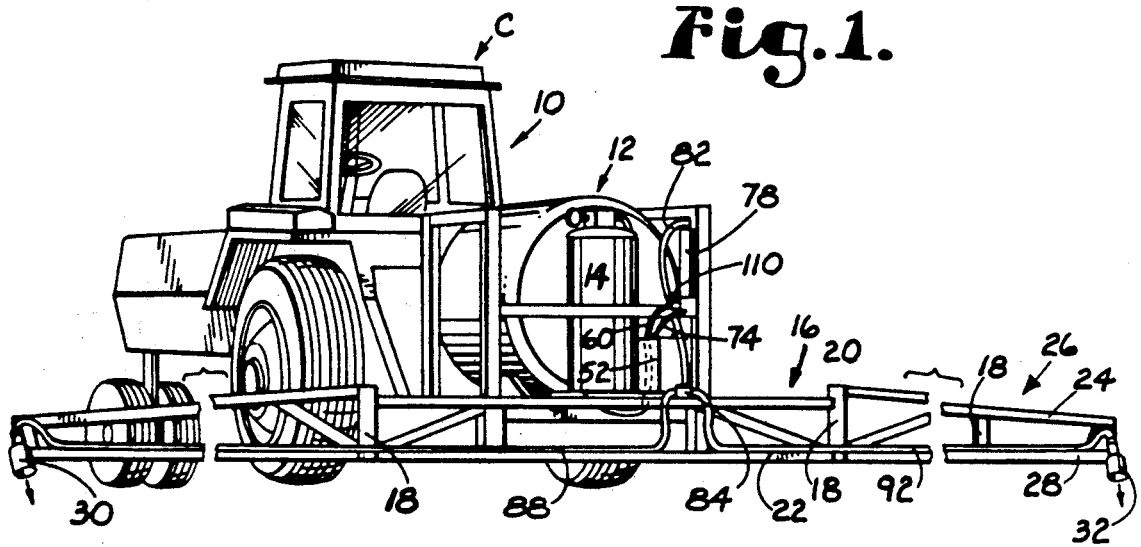
FIG. 1 is a perspective view showing the overall system embodying the present invention mounted on an agricultural vehicle.

Shown in FIG. 1 is an agricultural vehicle 10, such as a tractor or the like, which is used in treating areas with fertilizers, herbicides, insecticides or the like. The vehicle 10 therefore includes a dispersing system 12 which is used in the dispersing process. Neither the particular dispersing system nor the particular agricultural vehicle form a part of the present invention, and will thus not be discussed in greater detail. However, it is noted that the dispersing system will include the elements usual to such systems, such as appropriate dispersing nozzles or the like which are located with respect to the vehicle to disperse the material of interest in the most efficient manner.

As discussed above, it is important to mark the boundaries of the areas treated, and thus, the vehicle 10 includes a spray marking system 14 which is the subject of the present invention.

As shown in FIG. 1, the marking system 14 includes a sprayer boom 16 mounted on the vehicle 10, and which includes a plurality of sections that are adjustably coupled together at joints 18. The sprayer boom 16 includes an upper arm 20 and a lower arm 22 adjustably attached to the vehicle and each section includes an upper arm, such as upper arm 24 of outermost section 26, and a lower arm, such as lower arm 28 of outermost section 26, which are adjustably connected to the corresponding arms of the next section by the joint 18.

Movement of the sprayer boom 16 with respect to the vehicle 10 is controlled by the vehicle operator, and the means for moving such boom can include motors, controls located to be within easy reach of a vehicle operator sitting in the cab C of the vehicle and the like, as well as suitable joints and the like. The manner of moving the sprayer boom 16 with respect to the vehicle 10 will occur to those skilled in the art based on the present disclosure, and thus will not be further discussed.

As shown in FIG. 1, the sprayer boom 16 includes a marking foam dispensing nozzle 30 on one end thereof, and a second marking foam dispensing nozzle 32 on the other end of the boom. The dispensing nozzles 30 and 32 are located to dispense marking foam onto the ground at the outer boundaries of the area treated by the dispensing system 12, and are supplied with marking foam by the system 14 in the manner discussed below. The nozzles 30 and 32 are angled and oriented to dispense marking foam in the most visible manner, and will also be discussed in greater detail below with regard to FIG. 6.

Figure 2:
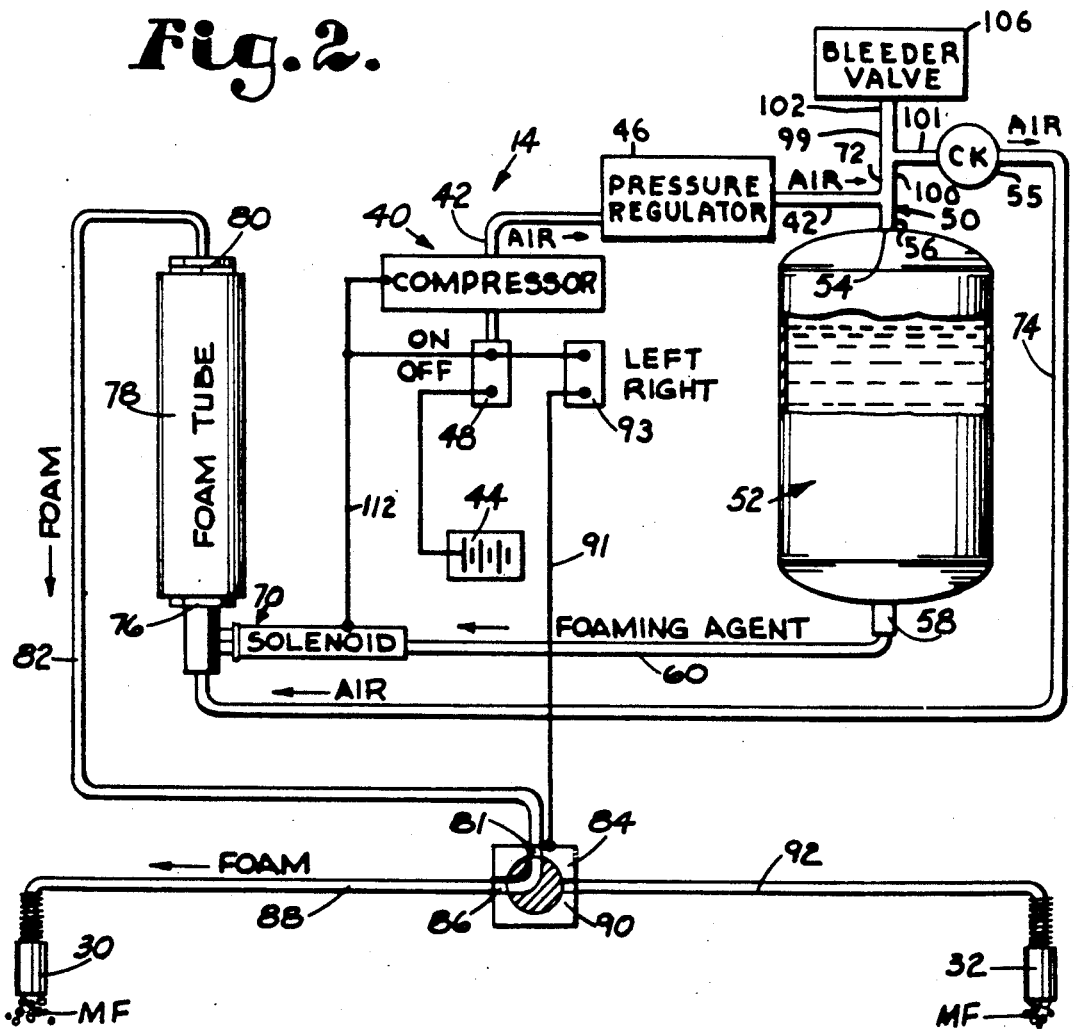
FIG. 2 is a schematic showing the fluid circuit associated with the foam marking system embodying the present invention.

Referring next to FIG. 2, the marking system 14 forming the subject of the present invention will be discussed. As shown in FIG. 2, the marking system 14 includes a compressor means 40 which is adapted to draw ambient air thereinto, compress such air to a desired degree, and force such compressed air out through an outlet line 42. The compressor means 40 can include the usual elements, and is driven by a power source, such as a battery pack 44 or the electrical system of the agricultural vehicle 10, and is controlled by means of an on/off switch 48. The degree of compression of the air in the outlet line 42 can be controlled by a pressure regulator 46 to control the pressure of the compressed air being supplied to the remainder of the system by the compressor means 40 for purposes of controlling the quality and quantity of the marking foam dispensed by the system 14, as will be evident from the discussion presented below.

Compressed air in line 42 flows through the pressure regulator 46 to a junction means or tank T-coupling 50 which is fluidically connected to a storage tank 52. The junction means 50 includes a pressure gauge 51 which is shown as being mounted on the junction means 50, but can be mounted in the vehicle cab C. The gauge 51 provides a visual readout of the pressure of the compressed air being supplied by the compressor means 40 so that system 12 parameters can be set to the most desirable values. The junction means 50 will be further discussed below in regard to FIG. 3. The storage tank 52 is adapted to contain liquid, such as water, and foaming agent, such as is commonly used in field marking, and has an inlet 54 to which a first outlet 56 of the junction means 50 is fluidically connected to flow compressed air into the storage tank in a manner that may be controlled by a check valve means 55 to pressurize the fluid in the storage tank to a level great enough to provide sufficient motive force to drive the fluid through the remainder of the system as will be seen from the ensuing discussion. The storage tank also has an outlet 58 through which a liquid/foaming agent mixture flows to be used by the remainder of the marking system 14.

The liquid/foaming agent mixture from storage tank 52 flows via conduit 60 to a mixing control means 70, which will be further discussed below, and is mixed with compressed air exiting the check valve means 55 which may be located in a second outlet 72 of the junction means 50 and flowing in conduit 74 therefrom to the mixing control means 70.

The mixing control means 70 combines compressed air from conduit 74 with a liquid/foaming agent mixture from conduit 60 in a ratio and in a manner as set by the components of the marking system 14 to form a marking foam-forming mixture. The mixing control means 70 is fluidically connected to an inlet 76 of a foam tube 78 to conduct this marking foam-forming mixture into the foam tube 78. This marking foam-forming mixture is converted into marking foam in the foam tube 78 and exits that foam tube 78 via an outlet 80.

A conduit 82 fluidically connects the foam tube outlet 80 to an inlet 81 of a selecting means 84 which further includes a first outlet 86 fluidically connected to a conduit 88 for fluidically connecting foam dispensing nozzle 30 to the foam tube 78 to receive marking foam therefrom, and a second outlet 90 for fluidically connecting second marking dispensing nozzle 32 to the selecting means 84 via conduit 92 whereby, when the selecting means 84 is appropriately operated, marking foam from the foam tube 78 is dispensed to the dispensing nozzle 32.

Operation of the selecting means 84 is controlled to select nozzle 30 unless a special command is given. This operation is preferably carried out by including a spring biasing means in the selecting means 84 to bias the outlet 86 into fluid connection with the inlet 81 of the selecting means 84, and to further include an electromagnetic device to overcome this spring bias when energized to move the selecting means 84 to fluidically connect the outlet 90 to the selecting means inlet 81. Such electromagnetic device can include an electromagnet in the selecting means 84 connected by a line 91 to a switch 93 that is connected to the battery pack 44. Operation of the switch 92 energizes the electromagnet to move the second outlet 90 into fluid connection with the inlet 81; whereas, unless the electromagnet is energized, the selecting means 84 will be spring-biased into a configuration that fluidically connects the first outlet 86 to the inlet 81. In this manner, the system can mark an area using either dispensing nozzle 30 or dispensing nozzle 32 as selected by the operator.

Operation of the marking system 14 is as follows: ambient air is compressed to a selected pressure by the compressor means 40 and flows to the storage tank 52 via the conduit 42, the pressure regulator 46 and the junction means 50 to pressurize the fluid contained in that storage tank. This pressurized fluid is then forced out of the storage tank into conduit 60 as a liquid/foaming agent mixture and moves to the mixing control means 70 to be combined with compressed air from the check valve means 55 and conduit 74. The ratios and parameters of the mixing of the compressed air from conduit 74 and the liquid/foaming agent from conduit 60 are varied and controlled by the mixing control means 70 to form a starting material for use in the foam tube 78 to generate the marking foam MF that is most desirable for a particular application.

As discussed above, the conditions to which the system 14 is exposed may vary from run to run or even within an individual run, and thus, the ability of the system 14 to vary the parameters and ratios of the marking foam-generating mixture permits the system to account for such changes in conditions.

Having discussed the overall system 14 and its operation, attention is next directed to FIGS. 3–7 for a discussion of the individual elements of that system.

Referring to FIG. 3, the junction means or tank T-coupling 50 is shown as having a coupling flange means 96 for releasably coupling the junction means 50 to the storage tank 52. This coupling means 96 can include hand-operated cams or the like. As is also shown in FIG. 3, second outlet 72 of the junction means 50 is fluidically connected to a valve assembly 98 including a valve T-coupling 99 with an inlet 100 fluidically connected to the junction second outlet 72. The valve T-coupling 99 includes a primary outlet 101 and a secondary outlet 102. The primary outlet 101 is connected to the compressed air conduits 74 via a nipple 103. The check valve means 55 selectively controls the flow of air from the primary outlet 101 to the air conduit 74.

The nipple 103 and the check valve means 55 may be secured in place on the primary outlet 101 by a wing nut 104.

The check valve means 55 can be adapted for delayed opening when a predetermined pressure level is attained in the storage tank 52, for example, five pounds per square inch (psi). By delaying the opening of the check valve means 55 and the introduction of compressed air through compressed air conduit 74 into the foam tube 78, the marking foam-forming mixture from the conduit 60 can accumulate in sufficient quantities in the mixing control means 70 to form marking foam MF having the desired properties. Furthermore, the check valve means 55 may control the air pressure in compressed air conduit 74 with respect to the pressure in the storage tank 52, which determines the pressure in the marking foam-forming mixture conduit 60. For example, in operation the air pressure in the air conduit 74 may be in the range of nine to fifteen pounds per square inch, and the pressure in the storage tank 52 may be in the range of fifteen to thirty pounds per square inch, with the pressure differential being established by the check valve means 55. As alternatives to the check valve means 55, various other flow and pressure regulating devices could be employed in the valve T-coupling 99 or the compressed air conduit 74.

The secondary outlet 102 mounts a bleeder valve 106 with an open position for communicating the tank 52 with the atmosphere and a closed position. With the marking system 14 in operation, the bleeder valve 106 is normally closed. The bleeder valve 106 is used to bleed compressed air from the marking system 14, and in particular from the storage tank 52. The bleeder valve 106 may be opened before the coupling 96 is removed from the storage tank inlet 54 to prevent the coupling 96 and the various components attached thereto from being hurled off of the storage tank 52 by the force of the compressed air therein.

It is also noted that the pressure gauge 51 can include a remotely located signaling device and/or feedback control system for further adjusting and controlling the operation of the system 14. The check valve means 55 can also include means for automatically opening when the pressure reaches a predetermined level, such as five psi, seven psi, ten psi, or the like.

Referring next to FIG. 4, the preferred form of the mixing control means 70 is shown to include a solenoidoperated valve 110 fluidically interposed in the conduit 60 between the storage tank 52 and the foam tube 78. The solenoid valve 110 is powered via line 112 connected to the on/off switch 48 to control the flow of fluid in the line 60. By suitably controlling the opening and closing of the solenoid valve 110, more or less liquid/foaming agent mixture may be supplied for producing the marking foam starting agent.

A filter 118 may be fluidically interposed between the conduit 60 and the solenoid operated valve 110, and a hand adjusting means 120 can also be included to permit easy dismantling of the mixing control means 70 for purposes of cleaning or the like.

Located downstream of the solenoid valve 110 is a mixing T-coupling 122 having a body 124 adapted to form a mixing chamber 126 and a first inlet means 128 adapted for cooperable coupling with the solenoid valve 110 by means of suitable coupling means, such as nipples, nuts and the like, to fluidically couple the chamber 126 with the storage tank 52 to receive liquid/foaming agent mixture therefrom. The mixing T-coupling 122 also includes a second inlet means 130 adapted to be releasably coupled to the compressed air conduit 74 to fluidically connect the chamber 126 to the compressor means to receive compressed air therefrom.

The mixing control means 70 further includes a spray nozzle means 134 fluidically coupled to the conduit 60 to dispense liquid/foaming agent in a spray pattern in the chamber 126. The spray pattern is indicated in FIG. 4 by the reference indicator S and is directed inwardly of the chamber 126. The spray nozzle means 134 can be of any design which is suitable for producing the fan spray pattern indicated in FIG. 4. The orifices of the spray nozzle means 134 affect its spray pattern S, and spray nozzle means having various numbers, sizes and configurations of orifices can be chosen to provide desired spray patterns of the liquid/foaming agent. Compressed air from conduit 74 is directed into the chamber 126 in the direction indicated by arrow A in FIG. 4, to flow towards the outlet 136 and is located and adapted to cooperate with the flow of the spray to combine the compressed air with the fluid in the spray within the chamber 126. This combination produces a mixture that flows to the foam tube 78 to be converted into marking foam in that foam tube 78. For this reason, the mixture formed in the chamber 126 will be referred to as marking foam starting mixture.

The foam tube 78 includes means for converting the marking foam starting mixture into marking foam MF, and such means can include steel wool W, Teflon scouring pad material or the like, and various foraminous screens and layers of material M.

As can be seen from the above, the quality and quantity of marking foam MF generated by the foam tube 78 can be controlled by adjusting the flow of compressed air into the chamber 126, by adjusting the flow of liquid/foaming agent mixture via the solenoid valve 110, or by adjusting the foam tube 78 itself. In this manner, the overall marking foam MF can be adjusted as necessary. It is also noted that the flow of compressed air across the spray nozzle 134 affects the amount of fluid dispensed from that nozzle, and the quality and quantity of marking foam MF produced can also be altered and controlled by means of the speed and amount of compressed air flowing across the spray nozzle 134 in a manner analogous to the conditions existing in a carburetor. In fact, to emphasize this feature of the system, attention is directed to FIG. 5 which shows the carburetor situation. It is noted that the operation of the FIG. 5 element is so similar to that of a carburetor that the full discussion of carburetor action will not be presented, but reference is made to standard texts, such as "The Internal Combustion Engine" by Charles F. Taylor and published by the MIT Press, for a full discussion of such action. It is noted that such discussion of the Taylor book is incorporated herein by reference thereto. Thus, as indicated in FIG. 5, the spray nozzle 134 is replaced by dispensing conduit 138 located adjacent to the throat area of a venturi-shaped passage 140, and compressed air from conduit 74 flows through the passage 140 and past conduit 138 to assist in the dispensing of fluid from that conduit. The compressed air mixes with the fluid from the conduit 138 and forms the marking foam starting mixture in chamber 142 that then flows to the foam tube 78 as indicated in FIG. 5 by arrow F.

Referring next to FIG. 6, the selecting means 84 is shown in detail. It is noted that this element is fully discussed in U.S. Pat. No. 3,985,333, assigned to Spraying Systems Co. of Wheaton, Ill., and the disclosure thereof is fully incorporated herein by reference. The selecting means 84 is described by the assignee as being "AA144-1-3 Three-Way Solenoid-Operated Directovalve". When power is applied to the selecting means 84, marking foam MF is directed to conduit 88 and flow to conduit 92 stops; whereas, when power is off, marking foam flows to conduit 92 and stops flowing to conduit 88. A cap 144 closes off one conduit of the selecting means.

The marking foam dispensing nozzles 30, 32 are identical, and nozzle 32 is shown in FIG. 7. The marking foam dispensing nozzles 30, 32 each includes a right-angle coupling 146 for connection by a hose clamp 149 to a respective conduit 88 or 92. A flexible connector tube 147 has a proximate end 148 connected to the coupling 146 by a hose clamp 149, and also has a distal end 150. A nozzle skirt 151 includes a neck 152 connected to the connector tube distal end 150 by a hose clamp 149 and a bottom 153 open to an interior 154. The skirt neck 152 extends into the skirt interior 154 and mounts a foam screen 155 by means of a hose clamp 149. The foam screen 155 may comprise, for example, open-woven fiberglass cloth or mesh formed as a porous, closed-end tube. The foam screen 155 functions to capture foam as it is dispensed under pressure from a conduit 88 or 92, and contributes to a certain amount of back pressure through the conduits 88, 92 in the foam tube 78. Such back pressure may be helpful in forming and dispensing the marking foam MF. The marking foam MF is forced through the foam screen 155 and may drop in globules to a field surface for demarcating a boundary of an area treated by the dispensing system 12. The globules of marking foam MF may drop at regularly-spaced intervals, or the marking foam MF may be dispensed substantially continuously. However, spaced globules are generally sufficient in the field to demarcate a boundary of an area treated by the dispensing system 12.

Figure 8:
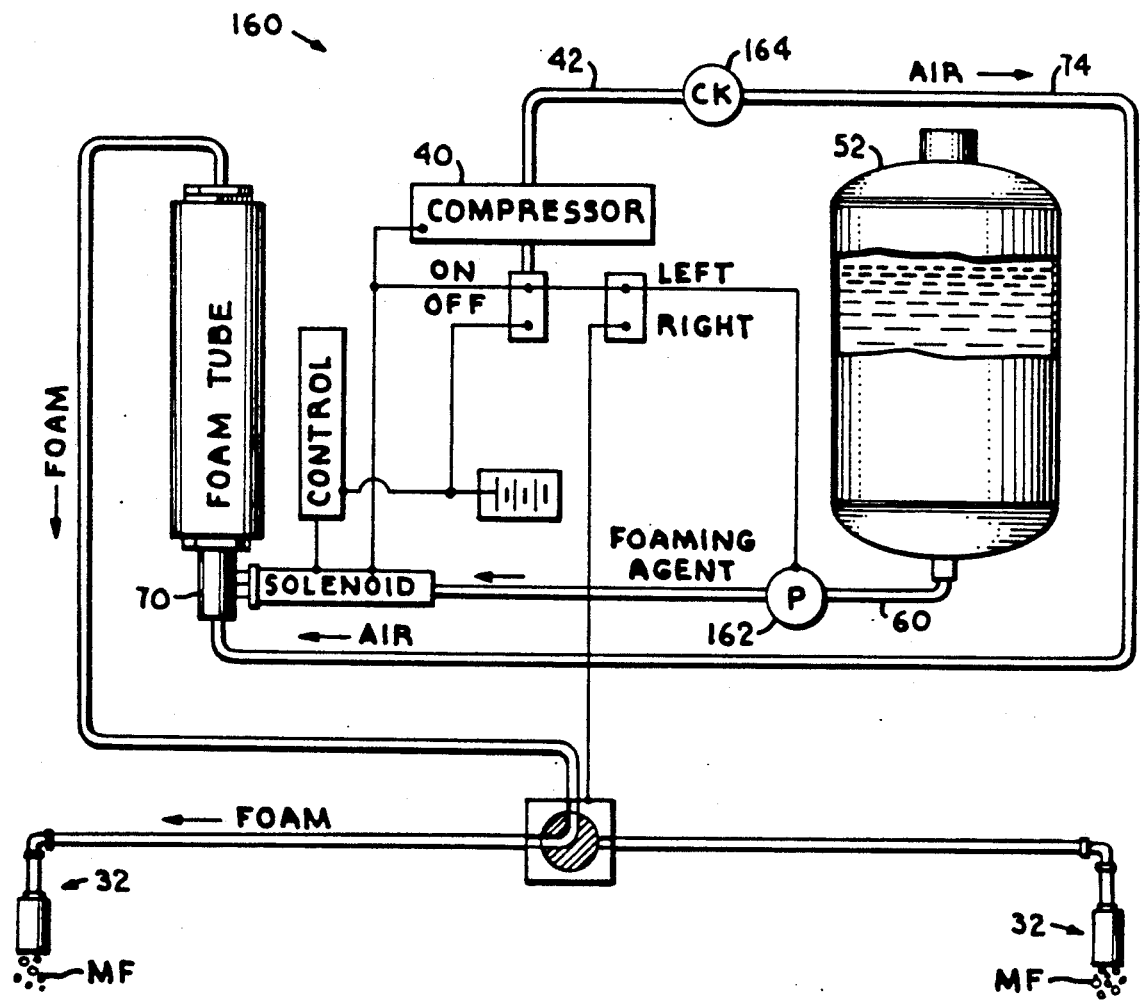
FIG. 8 is a schematic showing the fluid circuit associated with a foam marking system comprising a first modified embodiment of the present invention.

A foam marking system 160 comprising a first modified embodiment of the present invention is shown in FIG. 8 and includes a pump 162 in communication with the liquid foaming agent conduit 60 for pumping liquid foaming agent from the storage tank 52 to the mixing control means 70. Pressurized air is communicated from the compressor 40 via the compressor outlet line 42 to a check valve 164 and thence via the compressed air conduit 74 to the mixing control means 70. The foam marking system 160 operates to produce marking foam MF in a manner substantially similar to the marking system 14, except that with the system 160 liquid foaming agent is pumped from the storage tank 52 to the mixing control means 70 and pressurized air is communicated from the compressor 40 to a check valve 164 and then to the mixing control means 70.

It is to be understood that while certain forms of the present invention have been illustrated and described herein, it is not to be limited to the specific forms or arrangement of parts described and shown.

What is claimed and desired to be secured by Letters Patent is as follows:

1. A field spray marking system for indicating the boundaries of an area treated by an agricultural vehicle comprising:
   (a) a compressor means for supplying compressed air;
   (b) a storage tank being adapted to store liquid and foaming agent therein for forming a liquid/foaming agent mixture and having an outlet through which said liquid/foaming agent mixture exits from said storage tanks;

(c) pump means connected to said storage tank outlet for pumping said liquid/foaming agent mixture therefrom;

(d) mixing control means including a chamber fluidically connected to said compressor means to receive compressed air therefrom and fluidically connected to said pump means to receive liquid/foaming agent mixture therefrom, said mixing control means including means for introducing compressed air to the chamber, said mixing control means including means for spraying said liquid/foaming agent into said chamber, said mixing control means including means for controlling the mixing of compressed air and liquid/foaming agent;

(e) a foam tube having an inlet end with said mixing control means located thereat, means to produce marking foam, and an outlet end; and (f) a marking foam dispensing nozzle fluidically connected to said foam tube outlet end.

2. The invention of claim 1 wherein said means to produce marking foam comprises a foraminous material in said foam tube.

3. The invention of claim 2 wherein said foraminous material is filamentous.

4. The invention of claim 1 wherein said mixing control means includes:

(a) a solenoid-operated valve.

5. The invention of claim 1 wherein:

(a) said marking foam dispensing nozzle comprises a first marking foam dispensing nozzle and is selectively fluidically connected to said foam tube;

(b) a second marking foam dispensing nozzle selectively fluidically connected to said foam tube; and (c) selecting means having an inlet fluidically connected to said foam tube outlet end, a first outlet fluidically connected to said first marking foam dispensing nozzle, a second outlet fluidically connected to said second marking foam dispensing nozzle, a first position fluidically connecting said inlet and said first outlet and a second position fluidically connecting said inlet and said second outlet.

6. The invention of claim 5 wherein said selecting means comprises:

(a) a three-way valve; and (b) solenoid actuation means for moving said valve between its first and second positions.

7. The invention of claim 6, which includes:

(a) means for selectively coupling said compressor, said pump and said solenoid-actuated valve together for simultaneous actuation.

8. The invention of claim 1 wherein said foam tube is oriented generally vertically with said inlet end thereof comprising a lower end and said outlet end thereof comprising an upper end.

* * * * *